Nov. 1, 1966  K. R. LUNG  3,283,094
FLOW CONTROL VALVE AND SWITCH
Filed April 23, 1964  2 Sheets-Sheet 1
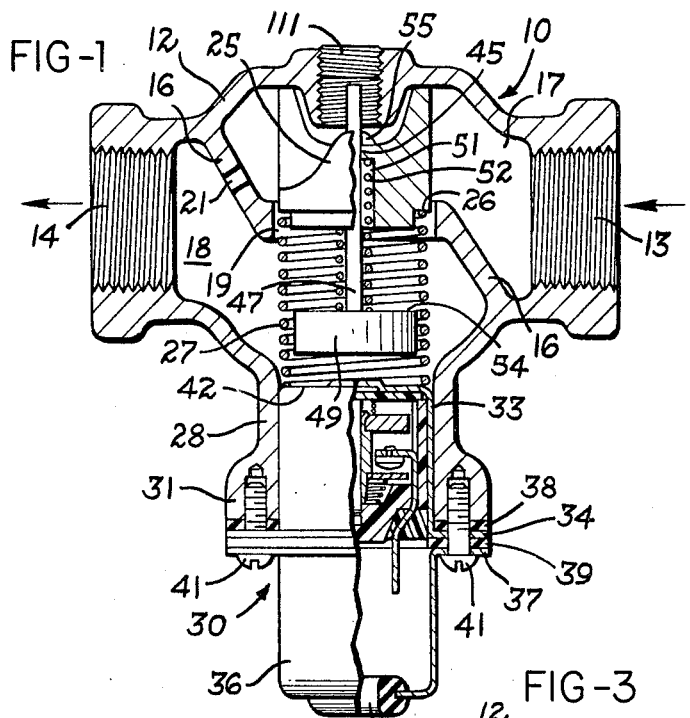
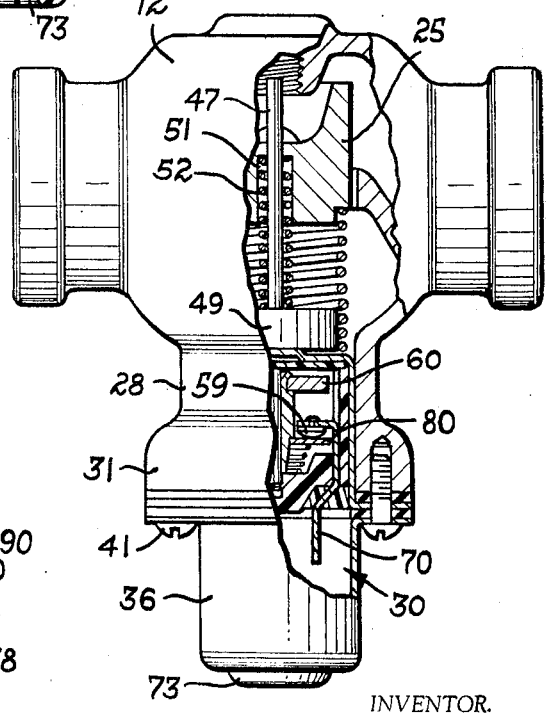
INVENTOR.
KENNETH R. LUNG
BY Marechal, Biebel, French & Bugg
ATTORNEYS

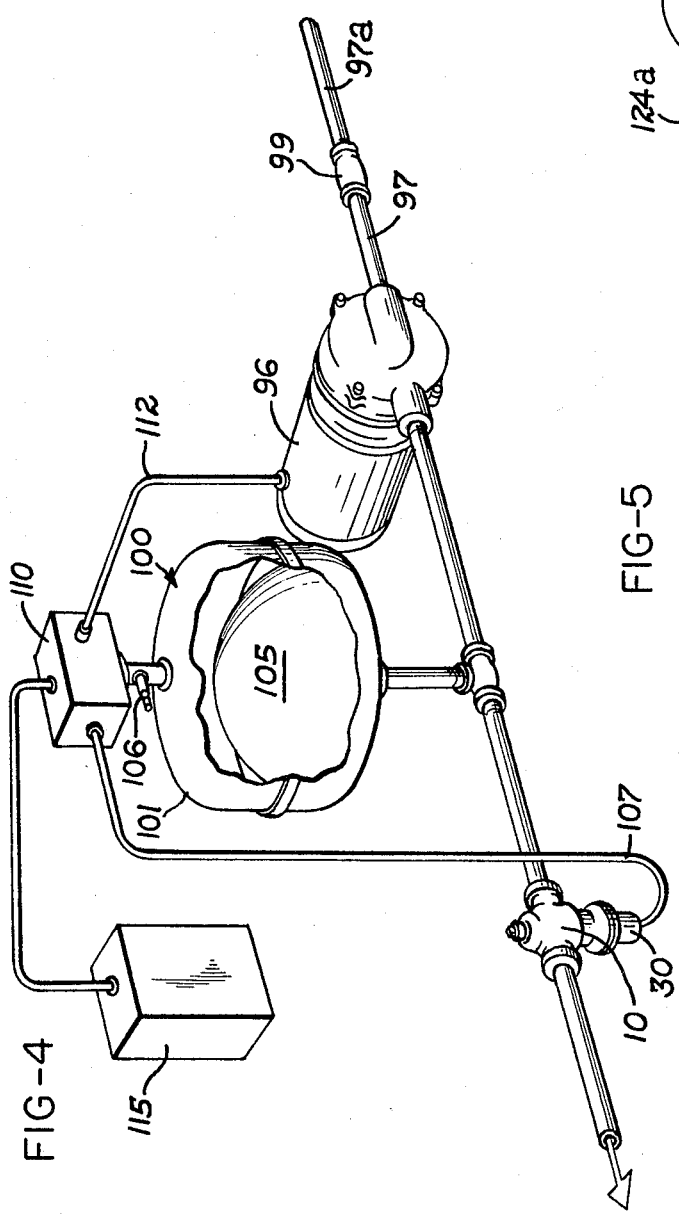
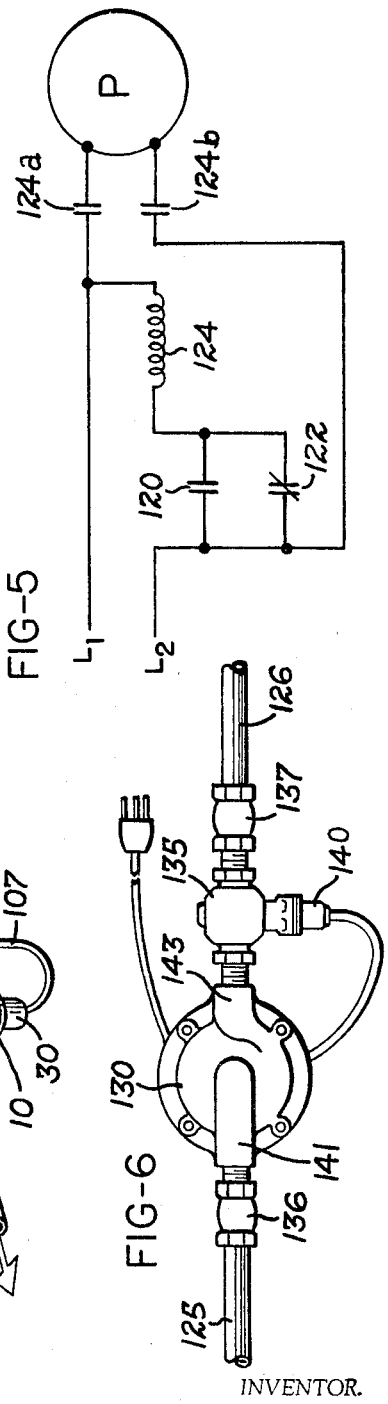

United States Patent Office 3,283,094
Patented Nov. 1, 1966

3,283,094
FLOW CONTROL VALVE AND SWITCH
Kenneth R. Lung, Morehead City, N.C., assignor to The Tait Manufacturing Company, Dayton, Ohio, a corporation of Ohio
Filed Apr. 23, 1964, Ser. No. 362,082
6 Claims. (Cl. 200—81.9)

This invention relates to a valve and switch assembly and more particularly to an improved valve and switch assembly responsive to a predetermined flow therethrough for controlling the operation of an electrical circuit.

The valve and switch combination of the present invention may be used to detect flow above a predetermined amount through a fluid handling conduit or the like and thus control the operation of one or more circuits, or it may be used in combination with a fluid pump, as will be described more fully below, to boost or increase water pressure in areas of low water pressure, or as a primary pump control system in instances wherein a well is used.

Heretofore, wells or pressure boostering systems included a pump and a pressure storage tank, the latter capable of storing between 20 to about 100 gallons of water wherein the operation of the pump was controlled by the pressure within the storage tank. The storage tank itself included a volume of air above the water which was compressed by the water present in the tank, the varying pressure operative to energize a pressure switch to actuate a pump in order to maintain a sufficient amount of water within the tank and under the proper pressure for use as a domestic water supply system. One difficulty associated with this type system is the fact that occasionally the air in the tank becomes absorbed into the water, thereby rendering it necessary to bleed the tank and make adjustments thereof. Additionally, if the operation of the pressure switch and tank are not properly adjusted, or if the volume of air is decreased substantially, a condition arises wherein the use of a small amount of water out of the tank results in immediate actuation of the pump so that withdrawal of small amounts of water from the tank results in actuation of the pump and a series of repeated starts and stops which may ultimately cause serious damage to the components of the motor.

In the type system above described, a condition is sometimes reached in which the extended use of water, for example watering a lawn, also results in frequent stops and starts at intervals which are so short in time that damage may occur to the circuit controlling the pump, particularly the starting circuit. Apart from the possible difficulty associated with damage to the electrical motor of the pump, and/or the starting circuit therefor, the pressurized storage tank heretofore utilized in domestic water supply systems generally hold in the neighborhood of 20 to 100 gallons of water, and thus the water to be used comes from a supply which has been standing in the supply tank rather than fresh water pumped from a well or the like.

It is a primary object of the present invention to provide an improved valve and switch assembly which is responsive to a predetermined flow through a fluid conduit for controlling one or more electrical circuits.

Another object of the present invention is the provision of a valve and switch assembly which includes an electrical switch maintained in fluid tight engagement with the valve body, wherein the switch includes a movable poppet controlling movement of an operating member which by magnetic forces controls the operation of the electrical switch in response to a predetermined flow through the valve.

A further object of the present invention is to provide an improved domestic water supply system or a booster assembly for a domestic water supply system wherein the conventional pressure tank is eliminated and which provides substantially fresh water.

A further object of the present invention is the provision of a domestic water supply system or booster therefor in which a flow valve and switch are used in combination with a pressure switch to maintain the motor of the pump operating as long as there is a predetermined small flow through the valve thereby preventing rapid and frequent starts and stops which tend to damage the starting circuit of the motor.

Other objects and advantages of the present invention will be apparent from the following description, the accompanying drawings and the appended claims.

In the drawings—

FIG. 1 is a view partly in section and partly in elevation of an improved flow control valve and switch assembly in accordance with the present invention;

FIG. 2 is an enlarged fragmentary view partly in section and partly in elevation of the switch assembly of the control valve in accordance with the present invention;

FIG. 3 is a view similar to FIG. 1 showing the relative position of the parts of the valve and switch during flow of fluid above a predetermined minimum;

FIG. 4 is a schematic illustration of an improved domestic water supply system in accordance with the present invention;

FIG. 5 is a schematic of a wiring diagram for the domestic water supply system shown in FIG. 4; and FIG. 6 is a schematic illustration of a booster pump and valve installation for a city water supply system in accordance with the present invention.

Referring to the drawings, which illustrate preferred embodiments of the present invention, the valve 10 includes a metallic body 12 having angularly spaced inlet and outlet passages 13 and 14 respectively which include threaded portions for attachment to pipes in a conventional manner. The interior of the body includes a partition 16 which divides the valve into an inlet chamber 17 and an outlet chamber 18 communicating respectively with the inlet and outlet passages 13 and 14. The inlet chamber 17 is preferably disposed axially and vertically above the outlet chamber 18 as viewed in the drawing, and the partition 16 includes an aperture 19 therein for providing fluid communicating between the inlet chamber and the outlet chamber. Partition 16 also includes a drilled hole 21 in the downstream side thereof which allows flow of some fluid through the valve. Mounted within the valve body is a poppet 25 having a diameter which is slightly less than the diameter of the aperture 19 formed in the partition 16, the poppet being movable between the inlet chamber 17 and the outlet chamber 18 and through the aperture 19. Fluid may flow around the outer surface of the poppet and through the aperture 19 as well as through the drilled hole or bleed hole 21. The lower portion of the poppet is provided with a shoulder 26 which receives a helically wound spring 27 mounted within the body 12 and operating to bias the poppet towards the inlet chamber 17, the poppet including a plurality of radially disposed guide fingers, as shown, which normally extend into the inlet chamber and which prevent cocking of the poppet during its movement.

The valve body 12 includes a tubular extension 28 preferably integral with the body and which receives an electrical switch assembly 30 maintained in sealed relationship with respect to the outlet chamber 18. The tubular extension 28 includes an annular shoulder 31 while the upper half 33 of the switch housing includes an annular flange 34. The lower half 36 of the switch also includes an annular flange 37, and the switch is maintained sealed to the tubular extension by the annular seal elements 38 and 39, seal element 38 being sandwiched between shoulder 31 and flange 34 while seal element 39 is sandwiched between the flanges 34 and 37, the entire assembly being secured in sealed relationship by a plurality of threaded bolts 41 received in the flange 34.

The helical spring 27 rests against the top 42 of the switch assembly to urge the poppet 25 in a vertically upwardly direction as previously described. The poppet 25 includes a center passageway 45 which receives a shaft 47 to which is affixed an operating member 49 whose function will be described more fully hereinbelow. The poppet is also provided with an internal counterbore 51 into which is received a small helical spring 52 which rests at one end within the center of the counterbore and at the other end against the back face 54 of the operating member 49. The shaft 47 of the operating member includes a collar or shoulder 55 which forms a stop preventing downward movement of the operating member in the absence of downward movement of the poppet. The helical spring 52 operates to exert an axial force maintaining the operating member 49 spaced from the poppet with the poppet positioned in the normal position as shown in FIG. 1.

Referring to FIG. 2, the switch assembly 30 includes a nonmagnetic housing previously described which forms a fluid tight surrounding structure for a pair of stationary contacts 59 positioned within the housing. Mounted within the housing is a washer 60 of steel or other magnetically permeable material and which may be screw threaded or otherwise fixed, as shown, to a brass or other non-magnetic and partially hollow shaft 61. A centering or guide pin 62 is embedded in an arc-resistant plastic cup-shaped member 64 and extends to the top wall of the housing, the cup-shaped member including side walls 65 for providing a guide for vertical movement of the shaft 61 with respect to the housing. An insulating plastic washer 66 such as polyethylene terephthalate resin is held against the upper wall of the housing above the washer 60 by the side walls 65 of the arc-resistant plastic member 64 to prevent any electrical shorting between the metallic housing and the shaft 61 as the latter moves in a vertically upward direction within the housing.

The spaced contacts 59 are carried by separate electrically conductive support members 70 and held within an epoxy resin potting compound 72 which maintains the conductive support members in fixed spaced and stationary relationship within the housing. Lead-in members may be affixed to the support members 70 by a bayonet fitting or the like, with the electrical cable fitting through a fluid tight grommet seal 73 shown in FIG. 1. The contacts 59 cooperate with a bridging contact 80 and operate as a switch which is in series with one line of the power input source to the motor or other circuit as will be described more fully below.

The bridging contact 80 is preferably of silver, or other conductive material and maintained in position on the lower tapered end 82 of the shaft 61 by a spirally wound helical spring 86 of generally increasing diameter. One end of the spring seated on the flange 89 located on the narrow end of the taper, and the other end thereof urges the bridging contact 80 against a flange 90 located above the tapered portion 82 of the shaft 61, the bridging contact element 80 being received by the shaft 61 and engaging the same along the non-tapered portion 92 thereof. The shaft 61 and the bridging contact element 80 are moved as a result of the movement of the operating member 49 which preferably carries a permanent ceramic magnet 93 movable as previously described. It is also possible to affix the magnet 93 directly to the shaft 47. Between the upper face of the magnetically permeable washer 60 and the upper portion of the switch housing is a spring 94 which surrounds the shaft 61 to render the switch position insensitive, that is, it may be mounted in any position relative to the horizontal plane. The strength of spring 94 is coordinated and correlated with the strength of the magnetic attraction between magnet 93 and the magnetically permeable member 60 to maintain the bridging contact 80 spaced from the fixed contacts 59 regardless of whether the switch is in the horizontal or vertical plane, or somewhere between the two.

Referring to FIGS. 1 and 3, the fluid flow through the valve 10 is from right to the left as viewed in the drawing, and primarily a function of the size of the space between the poppet 25 and the aperture, the hole 21 and the strength of the spring 27 which allow a small flow without effecting movement of the poppet. As the flow through the valve exceeds the predetermined amount the poppet is caused to move vertically downwardly carrying with it the magnetic operating member 49. As flow increases, the magnetic member 49 is moved further into close contact with the switch thereby attracting the magnetically permeable member 60 in a vertically upward direction and causing the bridging contact 80 to make contact with the spaced electrical contacts 59 to complete or break a circuit, as shown in FIG. 3. As flow is increased further, the poppet may continue its downward travel, or overtravel, against the force of spring 27 to allow passage of substantially full flow through the valve. For example, a flow of about one-third to three gallons per minute may cause no movement of the poppet while flow in excess of that rate causes actuation of the switch, with the valve being capable of handling twenty gallons per minute, for example.

As the rate of flow decreases, the poppet 25 moves vertically upward away from the switch, and when the movement thereof is sufficient to cause engagement between the stop 55 and the backface of the poppet, the magnetic member 49 is also moved vertically upward and away from the switch housing thereby allowing the magnetically permeable member 60 to move in an opposite direction causing bridging contact 80 to become disengaged from the contacts 59 for making or breaking the circuit.

The spring 86, which is preferably helically wound with a slightly increasing diameter from one end thereof to the other operates to impart a rotary spin to the bridging contact element 80 during its movement from one position to the other thereby evenly distributing the wear on the bridging contact element during operation of the switch.

The valve and switch assembly of the present invention may be utilized in a domestic water supply system as shown for example in FIG. 4 wherein the system includes a pump 96 which is installed in a fluid conduit 97, with the direction of flow being that indicated in the drawing. Upstream of the pump 96 is a check valve 99 which allows unobstructed flow towards the pump and prevents backflow into that portion of the conduit designated 97a.

The valve and switch assembly 10 of the present invention is installed downstream of the pump 96 or on the discharge side thereof with a pressure storage tank or pressure accumulator generally designated 100 being connected in fluid receiving relationship in the conduit 97 and between the valve 10 and the pump 96. The pressure tank 100 which may hold in the order of 4 to 10 gallons of water includes a generally cylindrical tank member 101 having an elastomeric bag 105 secured therein to provide a fluid receiving chamber. The tank 101 includes an air valve 106 in gas receiving communication with the air immediately above the elastomeric bag so that the air pressure acting on the elastomeric bag may be adjusted as desired. The elastomeric bag also operates as a barrier which prevents contact between the water and the air present in the tank thereby substantially eliminating contact between the two and reducing substantially the adsorption of air by the water.

The electrical leads 107 from the switch 30 of the valve and switch assembly 10 are connected to a pressure switch 110 which is preferably fixed in pressure receiving relation to the tank 101 and is responsive to the air pressure above the elastomeric bag 105. The switch 110 may be mounted directly on valve 10 and in liquid pressure receiving relation with the pressure in the valve as by screwing into the threaded top 111 (FIG. 1), although it is preferred that switch 110 be mounted for operation by air which does not corrode the parts as opposed to liquid which may corrode. The pressure switch is designed to come on at 20 pounds per square inch and to turn off at 40 pounds per square inch, for example, and includes electrical leads 112 connected to the motor of pump 96 for operation thereof, and power input may be from any convenient source indicated 115.

Affixed to the conduit 97 downstream of switch 10 is a conventional shut-off valve or spigot (not shown) and which operates to trap pressure between it and the check valve 99. Since liquid is present in the valve 10, but not flowing therethrough, the pressure in the inlet and outlet chambers is substantially the same as that in the conduit and the accumulator. Thus, connection of the pressure switch 110 to the accumulator provides an accurate indication of pressure conditions in the conduit 97 and the system.

The operation of the system of FIG. 4 may be understood with reference to the wiring diagram shown in FIG. 5 which is designed for use with a motor operated pump. Power input lines $L_1$ and $L_2$ from a suitable source include a plurality of switches connected thereacross including switch 120 which corresponds to the switch of the valve and switch assembly 10, and a normally closed switch 122 corresponding to the pressure switch 110. The normally closed switch 122 is in parallel electrical relationship with the flow switch 120 and both of these switches operate to control solenoid 124 and contacts 124a and 124b which control operation of the pump. Switch 122 is normally closed at atmospheric pressure thereby energizing relay 124 to close contacts 124a and 124b and thus the pump begins to operate. If no water is used, and the pressure in the tank 100 exceeds about 40 pounds per square inch, the pressure switch opens to deenergize solenoid 124 and opens contacts 124a and 124b to shut off pump 96. The system now includes water under about 40 pounds of pressure and is ready for immediate use. In the event that some water is used during a period of reduced pressure in tank 100, the switch 120 may be actuated by flow through the valve 10. For example, if a small amount of water is used such as a cup or pitcher of water, the flow control switch will not be activated to close contacts 120 unless the flow rate through the valve exceeds a predetermined minimum, for example about one gallon per minute. If water is used in an amount in excess of one gallon per minute, for example, then the flow control switch operates the pump and will continue to operate even though the pressure in the tank may be above about 40 p.s.i. If flow is less than one gallon per minute and the pressure in the system falls below 20 pounds per square inch, for example, the pressure switch 110 will be actuated and contacts 122 will be closed until pressure is again built up.

In the case where large amounts of water are used, for example during bathing, during operation of automatic appliances, such as a dishwasher or a washing machine, or for watering a lawn, the rate of flow through the flow control valve and switch is sufficiently high to close contacts 120 thereby keeping the pump in operation during the entire period of water usage thus providing a fresh supply of water under sufficient pressure. Once the flow rate decreases, and if the pressure in the pressure tank is less than 40 p.s.i., for example, the pump will continue operating because switch 122, operated by pressure, is closed, provided the pressure is less than 40 p.s.i. As the pressure builds up to the proper level, contacts 120 are opened and the pump will stop.

In the conventional system utilizing a storage tank having 20 to 100 gallons of water in the system, and during periods of high water usage, for example the washing operation or the lawn watering operation previously noted, the pressure progressively decreases as the water is used thereby causing the pump to be actuated only for a time sufficient to drive the pressure within the storage tank up to the predetermined value, and if water is thereafter used continuously, the pressure will again decrease and the pump will again go through a start and stop cycle. Moreover, if the pressure tank includes only a small volume of air because of absorption of air into the water for example, removal of relatively small amounts of water, will cause a start and stop cycle of the pump in order to bring the water pressure up to an acceptable level. Such rapid cycling in addition to the potential damage it may cause to the electrical components of the system also offers the disadvantage of fluctuating water pressure during periods in which the pump is not operating.

In accordance with the present invention, and as described above, these disadvantages are substantially eliminated by providing a flow control valve and switch which is electrically in parallel with a pressure switch and operative to maintain the pump operating during periods of extended usage when the flow in the conduit exceeds a predetermined maximum. In the event of withdrawal of a small amount of water, for example a cup of water, there will be insufficient decrease in pressure to cause actuation of the pump. With repeated withdrawals of a small amount of water, the pressure ultimately goes below 20 p.s.i., and the pump is on continually until the level of 40 p.s.i. is reestablished.

The improved flow control valve of the present invention may also be utilized in combination with a pump as a booster for a city water supply system. For example, in some cities during certain times of the year such as the summer, the city water pressure drops and the water pressure within the individual household is appreciably less than normal. Additionally, homes and the like located towards the top of a hill may have relatively low water pressure. In the case of older homes and older installations, the plumbing may create a problem of low pressure due to pipes of too small a diameter or friction loss through corroded pipes which is frequently aggravated by the use of automatic appliances requiring increased water usage such as electric garbage grinders, dish-washers, clothes washers and the like. In many areas, it is desirable to use a water softener and the pressure drop in a water softener may be as much as ten pounds per square inch, and this may create a problem in the event that water pressure is nearly normal or slightly below normal.

Referring to FIG. 6, which shows the booster system of the present invention, water is supplied through primary conduit 125 and flows to various points in the dwelling or the like through conduit 126. Arranged in series in conduits 125 and 126 is a pump 130 and a flow control switch 135 substantially the same as that described in connection with FIGS. 1 to 3. Connection of the pump and flow control valve may be made by threadless couplings 136 and 137 which are individually well known in the art. The electrical switch 140 associated with valve 135 is connected directly across power input lines so that in effect, switch 140 acts as an automatic starting and stopping switch for pump 130 in response to flow through the valve 135 above a predetermined minimum.

The normal household water pressure is between 20 and 40 pounds per square inch, and if water is drawn at the rate of less than two gallons per minute, the pump 130 is not actuated. The flow of water is through conduit 125 through the suction side 141 of the pump 130 through the discharge side 143, through the valve 135 and conduit 126 to its point of use. In the event that water is drawn at a rate in excess of two gallons per minute, for example, the flow switch is activated as previously described in connection with FIGS. 1 to 3 energizing the pump 130 for as long as water is drawn at a rate in excess of the predetermined minimum. For example, pump 130 may be a one-third horsepower pump having an output capacity of twenty to thirty pounds per square inch, and thus operates to maintain the pressure within the household at a normal level during periods of extended water usage and under circumstances wherein there is a reduction in pressure below a normal valve as previously described.

One advantage of the system shown in FIG. 6 is ease of installation in that the pump 130 and the switch 135 may be preassembled and installed directly into fluid conduit by merely removing the section of the conduit and inserting therein the assembled pump and switch. It is preferred that the switch be downstream of the pump, and if desired a one way check valve may be installed between conduit 125 and pump 130 permitting flow of water to the pump but preventing backflow thereof.

While the system of FIG. 6 has been described in connection with household water system, it is to be understood that it may be utilized with any fluid handling system in which the pressure tends to fluctuate and wherein it is desirable to maintain fluid pressure between predetermined levels regardless of the rate of usage thereof.

The improved flow control valve and switch of the present invention may be utilized to measure the amount of flow in a conduit, detect flow in a conduit or to control operation of various types of electrical equipment, for example an electrical motor and the like. It will be apparent that the magnetic member may be positioned within the switch housing as opposed to being carried or fixed to the shaft within the valve. Additionally, the pressures and flow rates described herein are merely illustrative, and the principles of the present invention are applicable to other pressures and flow rates as may be desired. Responsive movement of the poppet in the valve may be varied by varying the surface area thereof, for example, and the structure of the valve may be modified to allow any predetermined flow through the valve by adjusting the radial dimensions of the poppet with respect to the radial dimensions of the aperture thereby varying the clearance space between the two.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A valve and switch combination wherein said switch is operated in response to a predetermined flow through said valve, said valve comprising body means having an inlet and outlet passage, means dividing said body into an inlet chamber and an outlet chamber communicating respectively with said inlet passage and said outlet passage, said dividing means including means defining a passageway providing fluid communication between said inlet chamber and said outlet chamber, poppet means slidably mounted in said passageway for movement from one of said chambers through said passageway into the other one of said chambers in response to flow through said valve, means normally biasing said poppet toward said one chamber to a normal position, an operating member slidably mounted on said poppet, a switch mounted on said valve in sealed relationship with respect to said other chamber, said switch including a fluid tight non-magnetic housing having a contact actuating member therein, one of said members being magnetic and the other being of magnetically permeable material, means carried by said operating member for maintaining said operating member spaced from said switch with said poppet in said normal position, and the effective surface area of said poppet being coordinated and correlated with respect to the strength of said poppet biasing means to move said operating member into and out of switch operating relation in response to a predetermined flow through said valve.

2. A valve and switch combination wherein said switch is operated in response to a predetermined flow through said valve, said valve comprising body means having means dividing said body into an inlet chamber and an outlet chamber, said dividing means including means defining a passageway providing fluid communication between said chambers, poppet means slidably mounted in said passageway for movement from said inlet chamber through said passageway into said outlet chamber in response to flow through said valve, means normally biasing said poppet towards said inlet chamber to a normal position, an operating member slidably mounted on said poppet for movement in the same axial direction as said poppet in response to movement thereof, a switch mounted on said valve in sealed relationship with respect to said outlet chamber and in axial relation with said poppet and said operating member, said switch including a fluid tight non-magnetic housing having spaced stationary contacts therein, a contact actuating member in said housing and movable into and out of engagement with said stationary contacts, one of said members being magnetic and the other being of magnetically permeable material, means carried by said operating member for maintaining said operating member spaced from said switch with said poppet in said normal position, and the effective surface area of said poppet being coordinated and correlated with respect to the strength of said poppet biasing means to move said operating member into and out of switch operating relation in response to a predetermined flow through said valve.

3. A valve and switch combination wherein said switch is operated in response to a predetermined flow through said valve, said valve comprising body means having angularly spaced inlet and outlet passages, means dividing said body into axially spaced inlet and outlet chambers communicating respectively with said inlet passage and said outlet passage, said dividing means including means defining a passageway providing fluid communication between said inlet chamber and said outlet chamber, poppet means slidably mounted in said passageway for axial movement from said inlet chamber through said passageway into said outlet chamber in response to flow through said valve, said poppet including a plurality of radially disposed guide fingers normally extending into said inlet chamber and operative to allow flow over the surface thereof while preventing cocking of said poppet during movement thereof, means normally biasing said poppet towards said inlet chamber to a normal position, an operating member slidably mounted on said poppet and movable in the same direction as said poppet in response to movement thereof, a switch mounted on said valve in sealed relationship with respect to said outlet chamber, said switch including a fluid tight non-magnetic housing having spaced stationary contacts therein, a contact actuating member in said housing and movable axially relative to said poppet means into and out of engagement with said stationary contacts, one of said members being magnetic and the other being of magnetically permeable material, means carried by said operating member for maintaining said operating member spaced from said switch with said poppet in said normal position, and the effective surface area of said poppet being coordinated and correlated with respect to the strength of said poppet biasing means to move said operating member into and out of switch operating relation in response to said predetermined flow through said valve.

4. A valve and switch combination wherein said switch is operated in response to a predetermined flow through said valve, said valve comprising body means having an inlet and outlet passage, means dividing said body into an inlet chamber and an outlet chamber communicating respectively with said inlet passage and said outlet passage, said dividing means including means defining a passageway providing fluid communication between said inlet chamber and said outlet chamber, poppet means slidably mounted in said passageway for movement from said inlet chamber through said passageway into said outlet chamber in response to flow through said valve, means normally biasing said poppet towards said inlet chamber to a normal position, an operating member slidably mounted on said poppet and movable in response to movement of said poppet, a switch mounted on said valve in sealed relationship with respect to said outlet chamber, said switch including a fluid tight non-magnetic housing having a pair of spaced stationary contacts mounted therein, a bridging contact element normally spaced from said stationary contacts and movable into contact therewith, means within said housing effecting movement of said bridging contact element, said operating member being magnetic and said means being magnetically permeable for attraction to said magnetic operating member in response to movement thereof as controlled by said poppet, means carried by said operating member for maintaining said operating member spaced from said switch with said poppet in said normal position, and the effective surface area of said poppet being coordinated and correlated with respect to the strength of said poppet biasing means to move said operating member into and out of switch operating relation in response to said predetermined flow through said valve.

5. A valve and switch combination wherein said switch is operated in response to a predetermined flow through said valve, said valve comprising body means having angularly spaced inlet and outlet passages, means dividing said body into axially spaced inlet and outlet chambers communicating respectively with said inlet passage and said outlet passage, said dividing means including means defining a passageway providing fluid communication between said inlet chamber and said outlet chamber, poppet means slidably mounted in said passageway for axial movement from said inlet chamber through said passageway into said outlet chamber in response to flow through said valve, said poppet including a plurality of radially disposed guide fingers normally extending into said inlet chamber and operative to allow flow over the surface thereof while preventing cocking of said poppet during movement thereof, means normally biasing said poppet towards said inlet chamber to a normal position, an operating member slidably mounted on said poppet and movable in the same direction as said poppet in response to movement thereof, a switch mounted on said valve in sealed relationship with respect to said outlet chamber, said switch including a fluid tight non-magnetic housing having a pair of spaced stationary contacts mounted therein, a bridging contact element normally spaced from said stationary contacts and movable into contact therewith, means within said housing effecting movement of said bridging contact element, said operating member being magnetic and said means being magnetically permeable for attraction to said magnetic operating member in response to movement thereof as controlled by said poppet, means carried by said operating member for maintaining said operating member spaced from said switch with said poppet in said normal position, and the effective surface area of said poppet being coordinated and correlated with respect to the strength of said poppet biasing means to move said operating member into and out of switch operating relation in response to said predetermined flow through said valve.

6. A valve and switch combination as set forth in claim 1 wherein said poppet includes means defining a passageway, said operating member including a shaft received in said poppet passageway and slidably movable therethrough, stop means cooperating with said operating member and engageable by said poppet as the latter moves to said normal position, said means carried by said operating member cooperating with stop means and said poppet biasing means for permitting overtravel of said poppet toward said one chamber and permitting movement of said poppet toward said other chamber and engagement of said poppet with said stop for movement of said operating member toward said normal position in response to flow less than said predetermined flow through said valve.

References Cited by the Examiner
UNITED STATES PATENTS

| | | | |
|---|---|---|---|
| 2,628,296 | 2/1953 | Dillman | 200—83 |
| 2,628,297 | 2/1953 | Grauer | 200—81.9 |
| 2,791,657 | 5/1957 | Bloxsom et al. | 200—81.9 |
| 2,892,051 | 6/1959 | Moore | 200—81.9 |
| 2,981,195 | 4/1961 | Payne et al. | 103—25 |
| 3,057,977 | 10/1962 | Caswell | 200—81.9 |
| 3,104,614 | 9/1963 | Gramenzi | 103—25 |
| 3,109,908 | 11/1963 | Clason | 200—87 X |

BERNARD A. GILHEANY, *Primary Examiner.*

H. M. FLECK, *Assistant Examiner.*